United States Patent
Tönnby et al.

(10) Patent No.: US 6,515,996 B1
(45) Date of Patent: *Feb. 4, 2003

(54) MODEM WITH IP SUPPORT

(75) Inventors: Ingmar Tönnby, Stockholm (SE); Allan Hansson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 08/868,655

(22) Filed: Jun. 4, 1997

(30) Foreign Application Priority Data

Jun. 4, 1996 (SE) .............................. 9602212
Nov. 29, 1996 (SE) .............................. 9604409

(51) Int. Cl.[7] .............................................. H04L 12/28
(52) U.S. Cl. .................. 370/401; 370/352; 375/222; 379/93.09; 709/702
(58) Field of Search ................ 370/352–356, 370/524, 400, 401, 349, 589, 468, 389, 351; 375/222, 202; 709/202, 204, 230, 217; 340/426; 379/93.09, 211, 93.14, 114, 93.01; 345/1; 348/15; 714/15; 455/5.1

(56) References Cited

U.S. PATENT DOCUMENTS

| | | | |
|---|---|---|---|
| 4,630,262 A | * 12/1986 | Callens et al. ............... | 370/435 |
| 5,428,508 A | 6/1995 | Freeman et al. ............ | 361/818 |
| 5,513,251 A | 4/1996 | Rochkind et al. ......... | 379/93.35 |
| 5,608,786 A | * 3/1997 | Gordon ....................... | 370/352 |
| 5,610,910 A | * 3/1997 | Focsaneanu et al. ........ | 370/351 |
| 5,625,677 A | 4/1997 | Feiertag et al. ............. | 370/493 |
| 5,708,663 A | * 1/1998 | Wright et al. ............... | 370/524 |
| 5,726,984 A | * 3/1998 | Kubler et al. ................ | 370/349 |
| 5,764,639 A | * 6/1998 | Staples et al. ............... | 370/401 |
| 5,764,736 A | * 6/1998 | Shachar et al. .......... | 379/93.09 |
| 5,805,587 A | * 9/1998 | Norris et al. ................ | 370/352 |
| 5,884,032 A | * 3/1999 | Bateman et al. ............ | 709/204 |
| 5,917,405 A | * 6/1999 | Joao ........................... | 340/426 |
| 5,949,974 A | * 9/1999 | Ewing et al. ................ | 709/202 |
| 5,951,694 A | * 9/1999 | Choquier et al. ............. | 714/15 |
| 5,956,485 A | * 9/1999 | Perlman ...................... | 709/204 |
| 6,101,182 A | * 8/2000 | Sistanizadeh et al. ........ | 370/352 |
| 6,173,044 B1 | * 1/2001 | Hortensius et al. ...... | 379/93.09 |
| 6,246,695 B1 | * 6/2001 | Seazholtz et al. ........... | 370/468 |
| 6,320,857 B1 | * 11/2001 | Tonnby et al. ............... | 370/352 |

FOREIGN PATENT DOCUMENTS

| | | |
|---|---|---|
| EP | 676 886 | 10/1995 |
| EP | 777 364 | 6/1997 |
| WO | WO96/20553 | 7/1996 |

OTHER PUBLICATIONS

Product Information of "Pipeline 25–Fx" published by Ascend Communication Co. in May 1996.
Product Information of "Pipeline 25 Fx" published by Ascend Communication Co. in Dec. 1996.
Product Information of "Net Hopper" published by Rockwell Communications in 1994.
H.323 specification announced by International Telecommunication Union, May 1996, cover and pp. 11–12.

* cited by examiner

Primary Examiner—Hassan Kizou
Assistant Examiner—John Pezzlo

(57) ABSTRACT

A modem with IP support includes a device for autonomous, simultaneous access to the services of a switched telephony network and to the services of an IP based network. The autonomous, simultaneous access is established over a dialled up connection and is provided using the IP protocol.

15 Claims, 6 Drawing Sheets

MODEM WITH IP SUPPORT

TECHNICAL FIELD

The present invention relates to telecommunication in general and to simultaneous voice and data communication using the Internet protocols (IP). In particular the invention relates to a modem which allows access to the PSTN network (or to the ISDN network) and to IP-based networks from the subscriber end of a subscriber line.

BACKGROUND

A conventional data modem provides a digital bearer for digital information. A conventional data modem is typically connected between a computer and a subscriber line. A communication application running on the computer provides access to the Internet over PSTN. The subscriber line will be busy to the PSTN network if the communication application is involved in an ongoing IP session, such as surfing on the Internet, sending or receiving e-mail, running an IP phone application.

While an application is involved in an IP session it is not possible to make an outgoing call from a normal telephone connected to the same subscriber line as the modem because the subscriber line is busy.

In Swedish Patent Application No. 960 2212-4 there is described a telephony server allowing a user, which is involved in an IP session, to receive telephony calls from the PSTN/ISDN network to a personal computer used for the IP session. An incoming call directed to any member of the user's family can only be handled on the personal computer. It cannot be handled on another telephone device. Likewise another member of the family than the one engaged in the IP session cannot make an outgoing call over the normal telephone.

A DSVD modem is a modem that allows for digital simultaneous transmission of voice and data on a single line. To achieve this properly a DSVD modem must communicate with another DSVD modem. A DSVD modem comprises means for multiplexing packetized speech information and for sending the multiplexed information over a single link. A DSVD modem supports two independent sessions such as a telephony session simultaneously with an Internet session but has no means for accessing PSTN/ISDN services in order to establish such parallel sessions. A DSVD modem does not support the control procedure of analogue phones such as for example control procedures for off hook, on hook, DTMF signalling (dual tone multifrequency signalling), generation of ring signals, generation of ring tones, hook flash signalling.

SUMMARY

One object of the present invention is to provide a modem which allows an outgoing call as well as in incoming call on a normal telephone while simultaneously a communication application running on a personal computer is involved in an ongoing IP session over the modem.

Still another object of the invention is to provide a modem for autonomous, simultaneous access to the services of a switched telephony network, such as PSTN or ISDN, and to the services of an IP (Internet Protocol)based network, such as the Internet or an intranet, using the IP protocol.

Still another object of the present invention is to provide a modem that has at least two analogue telephony interfaces so as to allow a subscriber to have two different telephones which can be operated independently and simultaneously.

Still another object in accordance with the invention is to provide a modem allowing for internal telephony between a telephony application running on a PC and a normal telephone and allowing for internal telephony between two telephones connected to the IP modem in a subscriber's home.

A further objective of the invention is to provide a modem that allows connection to a home LAN (local area network in a subscriber's home) using the IP protocol.

Still another objective of the invention is to provide a modem that allows communication with devices, which are connected to the home LAN and which all support communication using the IP protocol, from an IP based network such as the Internet.

The above objects are attained with a modem of the general kind indicated in the attached claims.

The modem in accordance with the invention uses, in a manner known per se, the analogue transport capabilities of an analogue subscriber line to provide a two directional, 28.8 kb/s, or higher, digital transport capability.

DETAILED DESCRIPTION OF EMBODIMENTS

Figure 1:
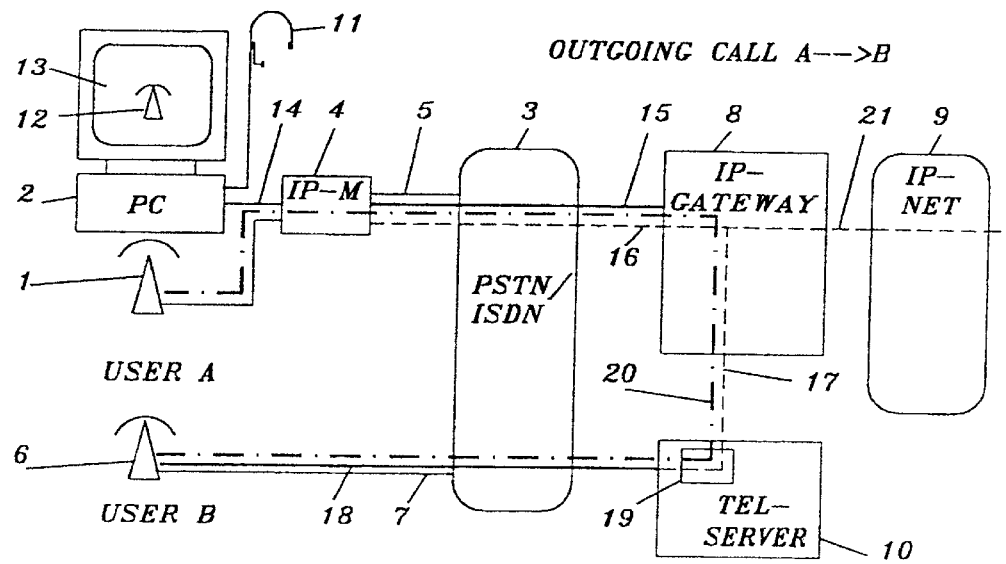
FIG. 1 is a block diagram of entities involved in an IP-network session among these the modem in accordance with the invention, a telephony server handling an outgoing call to the PSTN/ISDN network.

In FIG. 1 a user A has a telephone 1 and a PC (personal computer) 2 both connected to PSTN/ISDN 3 via a modem 4 in accordance with the invention and via a subscriber line 5. Another user B has a telephone 6 connected to PSTN via another subscriber line 7.

The modem 4 supports IP and related protocols, such as TCP (Transmission Control Protocols) and UDP (User Datagram Protocol). The modem is placed at the home of subscriber A and will in the following be referred to as an IP modem.

In FIG. 1 there is also shown a IP gateway 8, an IP based network 9 and a telephony server 10. The IP gateway is connected to PSTN/ISDN 3 and to an IP network 9.

The reference PSTN/ISDN 3 refers to networks to which the IP gateway and the telephony server are connected.

Examples of such networks are, besides from PSTN (Public Switched Telephony Network)and ISDN (Integrated Services Digital Network), a private telephone network, a PBX (Private Branch Exchange). Examples of an IP network are the Internet and intranet. Intranet is based on the technique by which Internet is built and is used for spreading information internally within an organization. Intranet uses IP and related protocols.

The telephony server 10 is connected to the IP gateway 8 and to PSTN/ISDN 3. The telephony server provides a telephony service to users of the IP-network. The telephony server is of the kind described in reference the cited Swedish application, contents of which is incorporated herein by reference. To the extent that is necessary for the understanding of the present invention the operation of the telephony server will be described.

The IP-gateway serves as an gateway between PSTN/ISDN and the IP network 9. The IP gateway 8 has physical connections with the PSTN/ISDN, with the telephony server 10 and with IP-network. For the sake of clarity these connections are not shown in FIG. 1. Over the connections between the telephony server 10 and PSTN/ISDN speech to and from users is transferred and signalling to and from PSTN/ISDN takes place. The connections between the IP gateway and the telephony server are constant, i.e. they are not established on a per call basis. As an example the telephony server 10 is connected to the IP-gateway via a non shown LAN and to the PSTN/ISDN via an ISDN or PABX line interface. Over the connections between the telephony server and the IP-gateway speech and data information is transported using the IP protocol.

The PC is equipped with a non shown sound card to which audio devices are connected. As an example of audio devices a headset 11 is shown, said headset comprising ear phones and a microphone. In FIG. 1 a telephony application 12 is shown by the telephone symbol at a screen 13 of the PC. The telephony application 12 comprises software that runs on the PC. It allows bi-directional voice communication over the sound card and the headset. The telephone application in conjunction with the PC and the sound card converts electrical voice signals from the microphone into digitized and compressed audio signals that are packetized into IP packets which are sent to the IP modem 4. Conversely the telephony application transforms IP packets containing digitized compressed audio signals into analogue electrical signals which are supplied to the ear phones of the headset The audio signals supplied to the sound card are processed by the PC and are exchanged with the IP modem via IP protocol driver programs. A cable 14 connects the IP modem with a serial port of the PC. For the moment it is assumed that telephony application is not running on the computer. It is also assumed that the IP modem is switched off.

Activation of the IP Modem

Before the IP modem is used for traffic purposes it is configured with the telephone number to the IP gateway 8 and with user data relating to subscriber A. As an example user data comprises the IP access user name of user A, a password and an IP address to the telephony server.

When the IP modem is activated IP functionality residing therein is activated. In order to get a clear understanding of the IP modem functionality reference is made to FIGS. 1 and 4.

Figure 2:
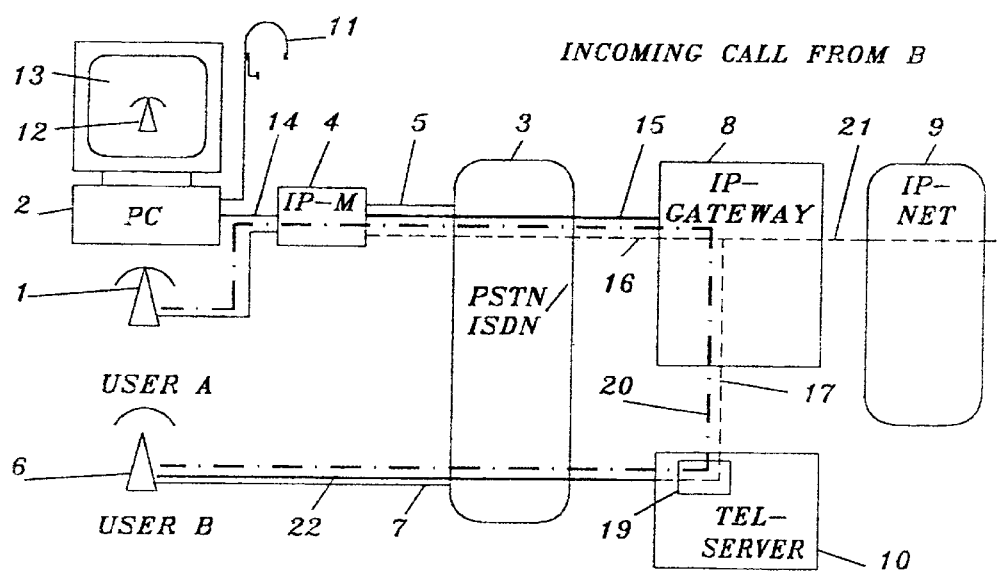
FIG. 2 is a block diagram similar to FIG. 1; the telephony server handling an incoming call from the PSTN/ISDN network.

When the IP modem is activated: (1) the IP modem makes an outgoing call to the IP gateway. A PSTN/ISDN connection 15 is established. (2) The IP gateway accepts the call. (3) Over an established, non-shown, V.34 connection a PPP (Point to Point Protocol) link is established between the IP modem and the IP gateway. Over the PPP link the IP gateway sets up a IP link 16 to the IP modem. (4) A telephony application resident in the IP modem sends a message to the telephony server telling the telephony server that a telephony application session shall take place for the user telephone number at the IP address of the IP modem. The message is sent in IP packets over one of said constant IP connections. In FIGS. 1 and 2 this connection is labelled 17. A telephony application can use the services of the PSTN/ISDN network.

Now the IP modem has registered itself at the IP gateway and the IP gateway is now able to route IP messages which as destination have the IP address of the IP modem 4 to the IP modem. Simultaneously the IP modem is registered at the telephony server, allowing access to PSTN/ISDN services. When the IP modem is registered at the telephony server one of the existing connections is assigned to the IP modem. The assigned connection is illustrated by an IP link 17.

In the Figures PSTN/ISDN connections are shown by heavy lines, IP links by dashed lines and speech paths by heavy dashdot lines.

Outgoing Call

Next user A wants to make an outgoing call and lifts the receiver of telephone 1. The IP modem detects this event and sends a dial tone to telephone 1. The IP modem 4 has all hardware required for acting as a conventional line card to user A's telephone. The operations performed by the IP modem in this respect is to provide e.g. off hook, on hook, line current, dial tone, ring signal, ring tone, hook flash (provided by R-key functionality in some telephony systems), and decoding of DTMF signals from telephone 1. It also has all necessary hardware and software for signalling to the telephony server in order to access the PSTN/ISDN services. In the following this software is referred to as the IP modem's telephony application.

Next user A dials the number to user B. The digits are received by the IP modem's telephony application. The IP modem's telephony application forwards the dialing information to a telephony application resident in the telephony server 10. The telephony server 10 interprets the dialing information and makes an outgoing call in the PSTN/ISDN network 3. The PSTN/ISDN network 3 sets up a PSTN/ISDN connection 18 to subscriber B. The PSTN/ISDN network is sending ring signals to subscriber B and the IP modem 4 is sending ring tones to subscriber A. When subscriber B lifts the receiver the PSTN/ISDN network detects this event and reports back to the telephony server 10 which in turn reports back to the IP modem 4. A connection has now been established between A and B.

When A talks the speech is transferred to the IP modem in the form of analogue signals. The IP modem, in a manner known per se, converts the speech into digital signals. The digitized speech signals are compressed using conventional speech compression algorithms. The digitized compressed speech is then packetized, by the IP modem 4, into IP packets which are sent over the IP links 16, 17 to the telephony server 10. The telephony server 10 has a converter 19 which converts received speech packets into isochronous speech signals which are sent over the PSTN/ISDN network to subscriber B.

When B talks the speech will be transferred to the telephony server 10 as speech signals. The converter 19 converts the speech signals into digitized, compressed information which are sent in IP packets to the IP modem 4 over the IP links 17, 16. The IP modem receives the IP packets, unpack them and decodes the speech information. Decoded speech signals are sent to the telephone 1. The speech path between A and B is shown by the dashdot line 20.

Coded speech will occupy only about 10–15 kb/s. The rest of the band width available on said connections can be used for other purposes.

As will be described further down the IP modem may simultaneously with the call to B have another telephone session running.

Simultaneously with the telephone call to B the IP modem may have an ongoing session with the IP network 9 as exemplified by IP link 21. As will be explained later the IP modem has multiplexor/demultiplexor functions that multiplexes information from different applications onto one and the same IP link to the IP gateway and that demultiplexes received information and forwards the demultiplexed information to their respective destinations. For example the IP modem will forward incoming IP packets from the Internet to an Internet application running on the PC 2 and will forward incoming packets containing speech information to the telephone 1 via a decoder, decompressor and a d/a converter. IP packets to and from the IP network will pass the IP gateway; they will not reach the telephony server.

If user A is running the telephony application 12 on the PC the sound card in the PC will deliver the sound, digitized, compressed and packetized, in IP packets to a PC interface of the IP modem 4. The IP modem 4 will forward them over IP links 16, 17 to the telephony server 10. In this manner user A may use the PC and the headset as a telephone.

Incoming Call

In this example it is supposed that the IP modem has been activated and registered its presence at the IP gateway and the telephony server. User A may or may not have an ongoing IP session. For the sake of clarity it is supposed that no IP session is taking place.

As mentioned in the previous example the IP modem will, when activated, set up IP link 16, 17 to the IP-gateway and to the telephony server. The IP modem's telephony application will send IP packets to a telephony application running in the telephony server. Among these there is one containing a message requesting the telephony server to activate the service "call forwarding" in the PSTN/ISDN network. Other means to request the call forwarding service are described in the Swedish patent application cited above. On behalf of user A the telephony server 10 requests call forwarding service in the PSTN/ISDN network and indicates as call forwarding number, i.e. the number to which calls directed to A shall be forwarded, a telephone number of the telephony server 10. When the call forwarding service has been completed a call to user A's telephone number will be routed by the PSTN/ISDN network to the telephony server 10.

User B wants to speak with user A over the telephone and dials the telephone number to user A. PSTN/ISDN detects that calls to A should be forwarded to the telephony server. A PSTN/ISDN connection 22 to the telephony server is established. The telephony server receives the call and notes it is directed to user A. Using the above mentioned registration data of A, said registration data comprising A's telephone number and A's IP address, the telephony server creates a relation between the incoming call and the IP modem's IP address. Various methods to accomplish this are described in the cited Swedish application. Next the telephony server sends IP packets to the IP modem over the IP links 17, 16; said IP packets comprising an alert message.

The IP modem receives the alert message and generates in response thereto a ring signal on A's telephone.

When A lifts the receiver the IP modem detects this event and sends a corresponding message in IP packets to the telephony server. A connection has now been established between B and A. Speech signals are sent from B to the telephony server over the PSTN/ISDN connection 22. In the telephony server converter 19 converts the speech signals into digitized compressed signals which are packetized in IP packets which are sent from the telephony server to the IP modem over the IP links 17, 16. In the IP modem the received IP packets are unpacketized, decompressed and converted into speech signals which are sent to the telephone 1. B and A can now have a conversation. The speech path is shown by the dashdot line 20 in FIG. 2.

If A does not answer the call the IP modem 4 takes no action. The telephony server continues to send ring tones to subscriber B. When B places the receiver in the cradle of the telephone 6 this event detected by the PSTN/ISDN which releases the connection between 6 and 10.

Instead of generating a ring signal upon reception of the alert message the IP modem itself may generate an audible signal or may send an alert message to the PC which then displays an alert message on the screen of the monitor 13.

Instead of answering the call user A may decide to redirect the incoming call to a call handler as described in the cited Swedish application.

When the conversation between A and B is finished the PSTN/ISDN connection 22 and the speech path 20 is released. The telephony server 10 releases the relation between the incoming call and A's IP address. The PSTN/ISDN connection 15 remains.

To establish the correct relation between an incoming call and the called user the telephony server must be given the destination of the incoming call from the incoming call itself. Several methods for achieving this are described in the cited Swedish application.

If user B makes a call to user A and user B also has an IP modem, then the call will be treated as a combination of an outgoing call with an incoming call.

Figure 3:
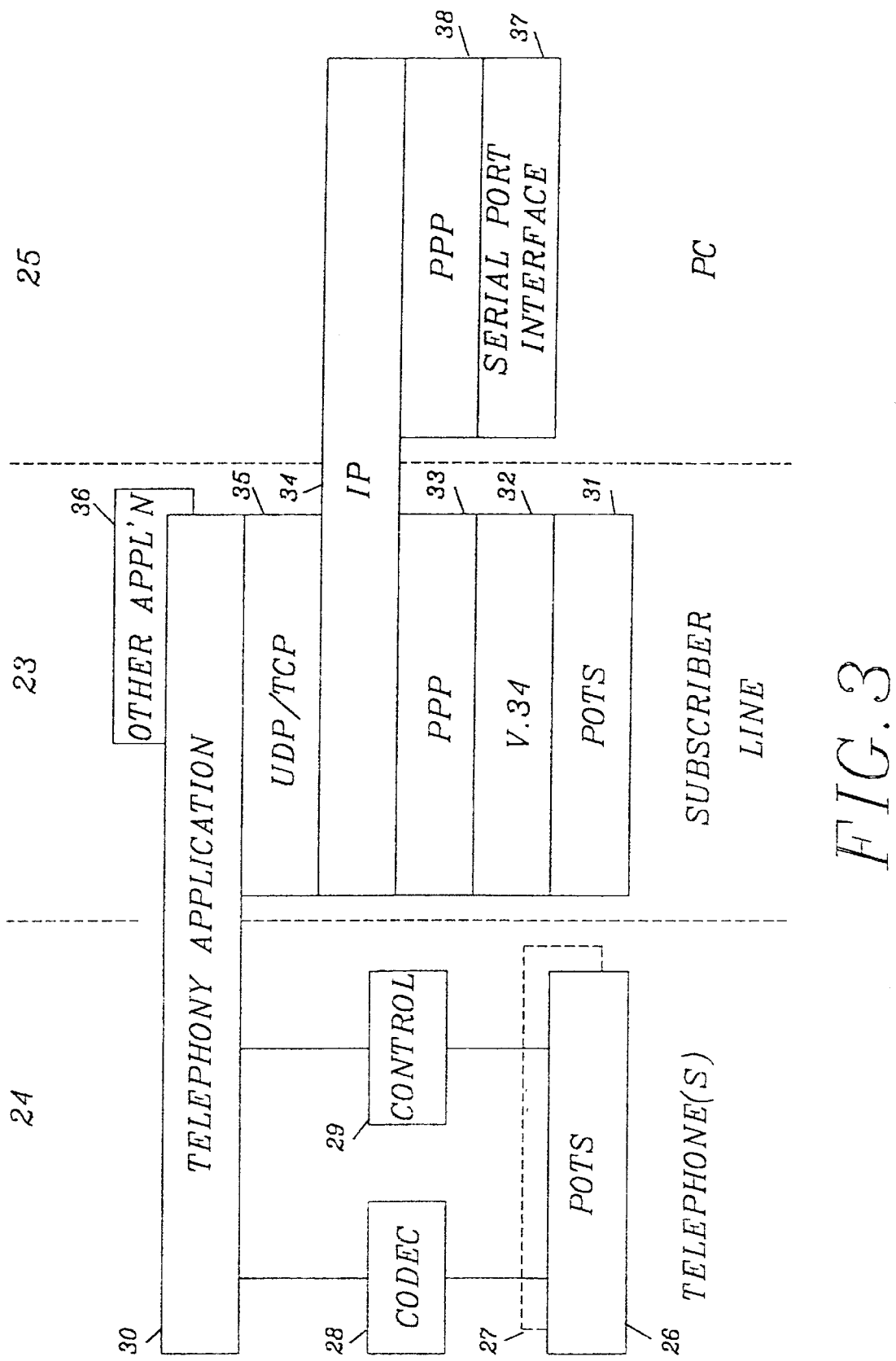
FIG. 3 is a block diagram of the general protocol stack used in the modem in accordance with the invention.

In FIG. 3 various protocols used by the IP modem are shown. In the IP modem there is one protocol stack per access type. Thus there is one protocol stack 23 for access to the subscriber line, one protocol stack 24 for access to the telephone or telephones and one 25 for access to the PC.

The telephone protocol stack 24 comprises as the lowest layer POTS (Plain Old Telephony Services)access "protocol" 26. If the subscriber has two telephone accesses, i.e. there are two telephones connected to different loops, then there is another POTS access "protocol" 27, as indicated by the dashed line. Over the POTS access layers there is a layer comprising coding/decoding 28, labelled CODEC, and control 29 of signals exchanged between the POTS layer and the uppermost telephony application layer. The IP modem's telephony application 30 provides i.a. functions for handling incoming and outgoing calls, functions for operating the specific telephone type used, and functions for transfer of signals between the telephone(s) and the PSTN/ISDN.

The subscriber line protocol stack 23 comprises, a bottom POTS layer 31, over the POTS layer a V.34 protocol layer 32 providing among other things common data exchange functions, over the V.34 layer a PPP (Point to Point Protocol) protocol layer 33, over this an IP (Internet Protocol) layer 34, over the IP layer an UDP/TCP layer 35(User Datagram Protocol and Transmission Control Protocol respectively) and over the UDP/TCP layer the telephony application layer. The UDP protocol is used for voice transmission and the TCP protocol for signalling between the telephony application layer and the IP layer. The telephony application layer 30 is the uppermost protocol layer of the subscriber line protocol stack and is common to the subscriber line protocol stack and the telephone protocol stack.

Figure 4:
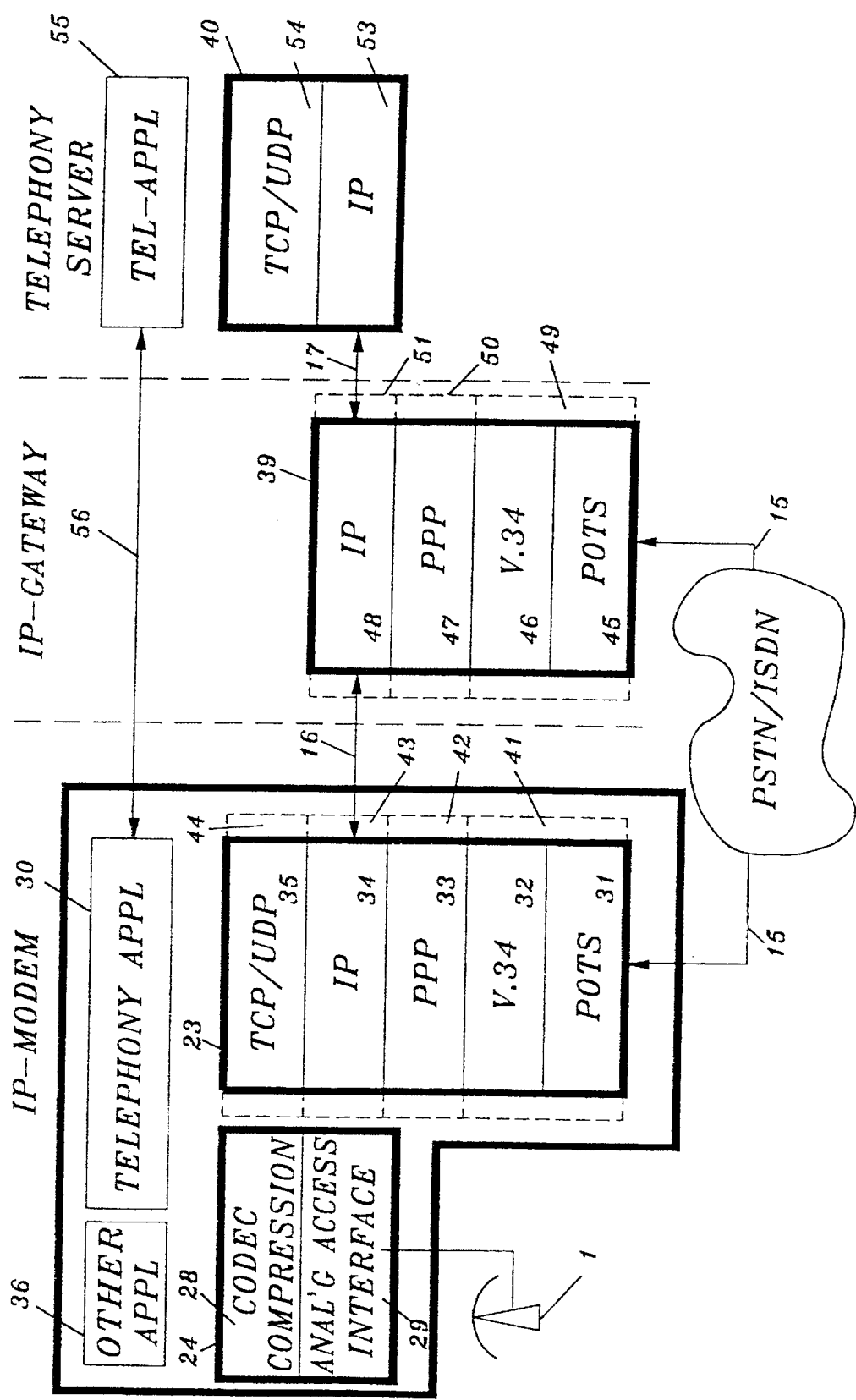
FIG. 4 is a block diagram showing a specific protocol stack used by the modem in accordance with the invention when a telephony application is running.

For the sake of clarity the control means by which a V.34 connection is established are not shown in FIG. 4. Such control means are resident in the IP modem.

As will be explained below there may be other applications running in the IP modem. Such other applications are at the same protocol layer level as the telephony application layer and uses one or more of the underlying UDP/TCP, IP, PPP, V.34 and POTS protocols depending on the specific application. In FIG. 3 one such other application is shown at 36.

The PC protocol stack comprises, from the bottom, a serial port interface layer 37, a PPP protocol layer 38 and as uppermost layer the IP protocol layer 34.

FIG. 4 illustrates how the protocols shown in FIG. 3 are used by the IP modem's telephony application 30 for communication with the IP gateway and the telephony server. In the IP modem the telephone protocol stack 24 and the subscriber line protocol stack 23 are used. In the IP gateway a protocol stack 39 is used for access to PSTN/ISDN and in the telephony server a protocol stack 40 is used for access to the IP gateway. The telephony server also has a non shown protocol stack, similar to the subscriber line protocol stack, for access to PSTN/ISDN. The latter protocol stack is not shown in order not to destroy the clearness of FIG. 4.

The lowest protocol layer of protocol stack 24 is the POTS layer 26 which in this case is an analogue access interface providing communication in PSTN/ISDN. Over the POTS layer is CODEC 28 and CONTROL 29 layers. Over this latter layer is the telephony application 30.

The lowest protocol layer of structure 23 is POTS layer 31 providing communication in PSTN/ISDN. Over the POTS layer 31 is the V.34 protocol layer providing a raw digital link on the PSTN/ISDN connection 15. Over the V.34 protocol layer there is the PPP protocol layer 33 allowing for transmission of IP packets. Over the PPP layer is the IP protocol layer 34 allowing for handling of IP addresses. Over the IP layer is the TCP/UDP protocol layer 35. In the IP modem the POTS access protocol layer and the V.34 protocol layer are handled by a standard data modem 41, the PPP protocol layer by a PPP handler 42, the IP protocol layer by an IP handler 43 and the TCP/UDP protocol layer by a TCP/UDP handler 44. Each one of the handlers 41, 42, 43 comprises software of known art.

The IP gateway protocol stack 39 for access to the PSTN/ISDN network comprises, from the bottom, a POTS protocol layer 45, a V.34 protocol layer 46, a PPP protocol layer 47 and an IP protocol layer 48. The POTS and V.34 protocol layers are handled by a modem pool 49, the PPP layer by a PPP handler 50 and the IP layer by an IP handler 51. The IP gateway has also a non shown protocol stack for access to the non shown constant IP connections to the telephony server. This non shown protocol stack has an IP protocol layer which it shares with IP protocol layer 48.

The telephony server protocol stack 40 comprises, from the bottom, an IP protocol layer 53 and a UDP protocol layer 54. In the telephony server these layers are handled by a PPP handler, an IP handler and a UDP handler respectively. The IP protocol layer 53 is carried by a non shown LAN interface.

The IP modem's telephony application 30 communicates with an telephony application 55 in the telephony server using the UDP protocol and the TCP protocol. Such communication is indicated by the double headed arrow 56.

As indicated above the IP modem also may have one or more other applications 36 which communicate with other similar applications using the TCP protocol layer. An example of an other application is an e-mail poller, polling the e-mail boxes user A may have in the IP network 9. When there is mail in a mailbox an indication is given, for example a visual indication. Another example of an application is remote handling of consumer devices, such as an electricity consumption meter. Other examples will be given below with reference to FIG. 5.

Figure 5:
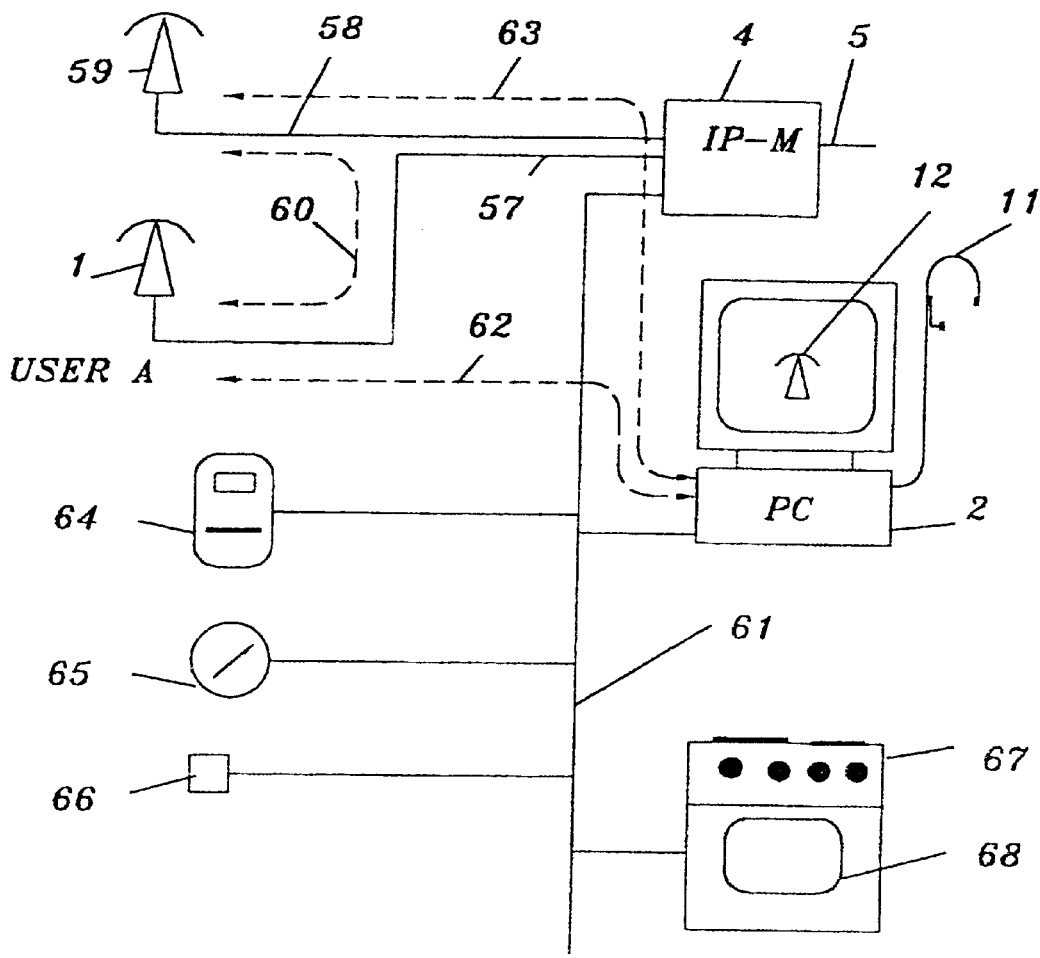
FIG. 5 is a block diagram of a home LAN (local area network) served by the modem in accordance with the invention.

In FIG. 5 there is shown how the IP modem 4 in accordance with the invention is used to provide internal communication between two different loops to which user A has telephones connected. One loop is labelled 57 and another loop is labelled 58. Several telephones may be connected to each loop. In FIG. 5 one telephone 1 is shown to be connected to loop 57 and one telephone 59 is connected to loop 58. Each loop is connected to a respective physical port to the IP modem. Each port is operated by the telephony application 30. A telephone connected to loop 57 can therefore communicate with a telephone connected to loop 58. In the example shown telephones 1 and 59 can communicate with each other. In this way intercom is provided by the IP modem. This is illustrated by double headed arrow 60.

In accordance with the invention the IP modem 4 has a LAN application and therefore serves as a simple router of a home LAN 61 to which different devices are connected. Each connected device supports the TCP/IP protocol, in other words they "speak" IP, and can therefor communicate with other devices, remote from the LAN, provided said other devices also support communication using the TCP/IP protocol.

In particular the telephony application 12 running on the PC can communicate with any of the two telephones 1, 59 via the IP modem. This is illustrated by the two double headed arrows 62, 63. Intercom is thus provided between the headset 11 and any of the telephones 1, 59.

To the home LAN 61 an electricity consumption meter 64, a water consumption meter 65, a smoke and fire detector 66, a stove 67 with an oven 68 are connected. This configuration allows remote handling, such as read out, of the electricity and water consumption meters. When the smoke and fire detector detects smoke an alarm telephone number, for example to an SOS alarm center or to the fire brigade, is automatically dialled by the IP modem. With this configuration it will also be possible to remote operate the stove as well as the oven, e.g. from a PC with access to the IP network.

It goes without saying that the IP modem 4 supports a number of features to enhance traditional telephony such as abbreviated dialing numbers. An abbreviated dialing number may include an IP address for an address which can be reached by IP phone.

Basic Telephone

Figure 6:
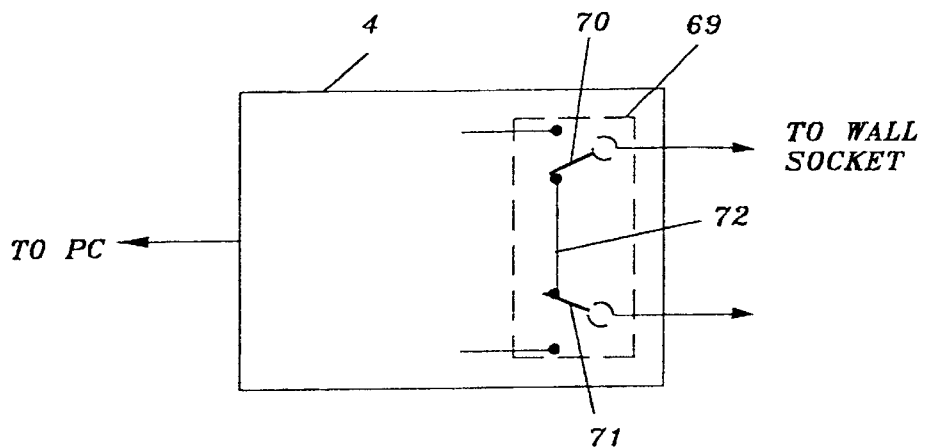
FIG. 6 is a circuit diagram of a safety feature of the modem in accordance with the invention.

The IP modem 4 operates into different modes depending on user A's desires and depending on the kind of services required by A. The IP-network and PSTN/ISDN network services available from the IP modem have been described in connection with FIGS. 1–5. In FIG. 6 the basic telephony service is shown. The IP modem 4 comprises a relay 69 with two movable contacts 70, 71. Contact 70 is adapted to be connected to the wall socket in A's premises and from there to the subscriber line to the local office. Contact 71 is adapted for connection to user A's telephone loop 57. Each movable contact can move between two stationary contacts, two of which are interconnected by a cable 72. When the movable contacts are in the position shown in FIG. 5 basic telephony mode is provided. When the movable contacts are in their opposite positions the IP mode described in connection with FIGS. 1–5 is provided. In the position shown in FIG. 6 a telephone connection is hard wired through the IP modem. In this position A's telephone apparatus will be connected, usually via a non shown wall socket, to the subscriber line. When main power is down the default mode of the IP modem will thus be basic voice telephony. Basic voice telephony mode can also be manually selected by user A, for example by flipping a non-shown switch on the IP modem.

Figure 7:
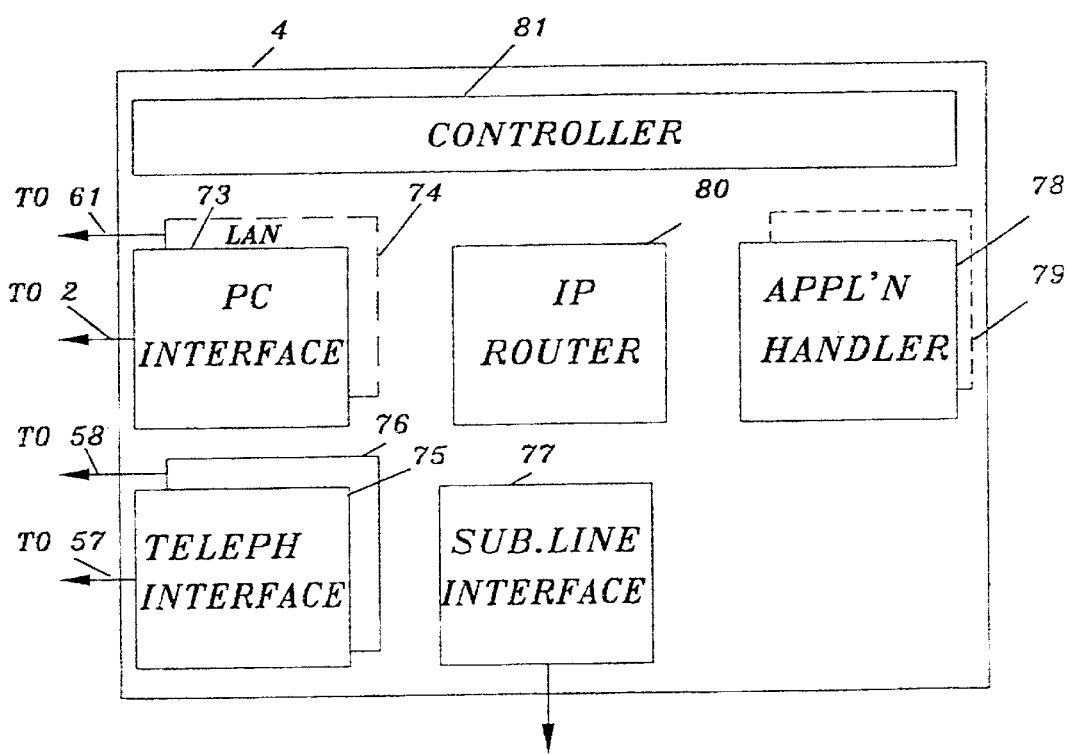
FIG. 7 is a functional block diagram of the modem in accordance with the invention.

In FIG. 7 a functional block diagram of the IP modem 4 is shown. It comprises a PC interface 73/72 providing a serial interface using the IP and PPP protocol layers 34, 38. Thus the PC interface supports exchange of IP packets. Instead of the serial PC interface 73 there may be a LAN interface 74 shown by dotted lines.

There is also one telephone interface 75 for connection to loop 57, one telephone interface 76 for connection to loop 58 and one subscriber line interface 77 for connection to the analogue subscriber line. The telephone interfaces are enhanced with capabilities to detect control signals from a telephone, such as off hook, on hook, hook flash signals, DFTM signals and to generate ring signals, dial tones and other acoustic signals. The telephone interfaces convert the speech into digital signals which are compressed, for example using GSM compression, packetized and put into IP packets. Incoming IP packets which carries speech are processed in the reversed way. It should be noted that the safety device provided by items 70, 71, 72 supports one telephone interface only, for example telephony interface 75. The subscriber line interface 77 further comprises standard data modem capabilities to provide for a bi-directional 28.8 kB/s or higher digital transport capability.

There is also one or more application handlers 78, 79. In one of them, for example 78, said other application 36, for example the e-mail polling application, is residing. In the other, other applications are residing, for example applications which provide functionality required to operate devices attached to the IP modem by way of the LAN 61. An exemplary such other application is one that switches the oven off when the smoke detector detects smoke.

There is also an IP MUX/DMUX functionality 80, also referred to as IP router functionality, which takes IP packets from the different interfaces and sends them in proper order to the subscriber line interface 77. The IP MUX/DMUX functionality also provides for reception of IP packets from the subscriber line interface and for delivery of the received IP packets to their proper interfaces. Finally there is an overall control functionality 81 for controlling the operation of the IP modem's various functionality's.

Local Mode

When power to the IP modem is on and the modem has no connection to the IP network 9 the modem is said to be in its local mode.

If the IP modem is in its local mode intercom is possible using the telephony application 30. The intercom possible in the local mode is exemplified by arrow 60 in FIG. 5, In the local mode of the IP modem other applications 36 can run on the home LAN. As an example the above mentioned application that switches the oven off when smoke is detected may be running on the LAN. In the local mode one such other application 36, not necessarily anyone of those exemplified above, can instruct the IP modem to set up a connection to the IP network 9. As an example the e-mail polling application can check if there is any e-mail to user A in a mail box. The mail box is resident in the IP network. To check this the IP modem makes a call to the. IP gateway. When the connection has been established the e-mail polling application sends an IP poll to the mail box and communicates with it using IP. Such a call may for example be made at regular intervals.

In the local mode of the IP modem an external application, i.e. an application running on a communication device outside of user A's home, can establish communication with an other application 36 in user A's IP modem 4. As an example a mail box in the IP network 9 can request an IP gateway to call the IP modem 4 in order to deliver mail for user A. Another example is an external application that reads the electricity consumption meter 64 from a remote site. Upon reception of a call from an external application the IP modem identifies the caller, based on e.g. number identification, and as a result of the identification the call is accepted or rejected. If the call is from a valid IP session initiator the call is accepted, otherwise it is rejected. If the call is accepted the IP modem enters connected state mode and starts an IP session with the external application. Connected state mode implies that the IP modem is connected and communicates over the IP protocol layer. If the call is rejected the IP modem remains in the local mode.

Figure 8:
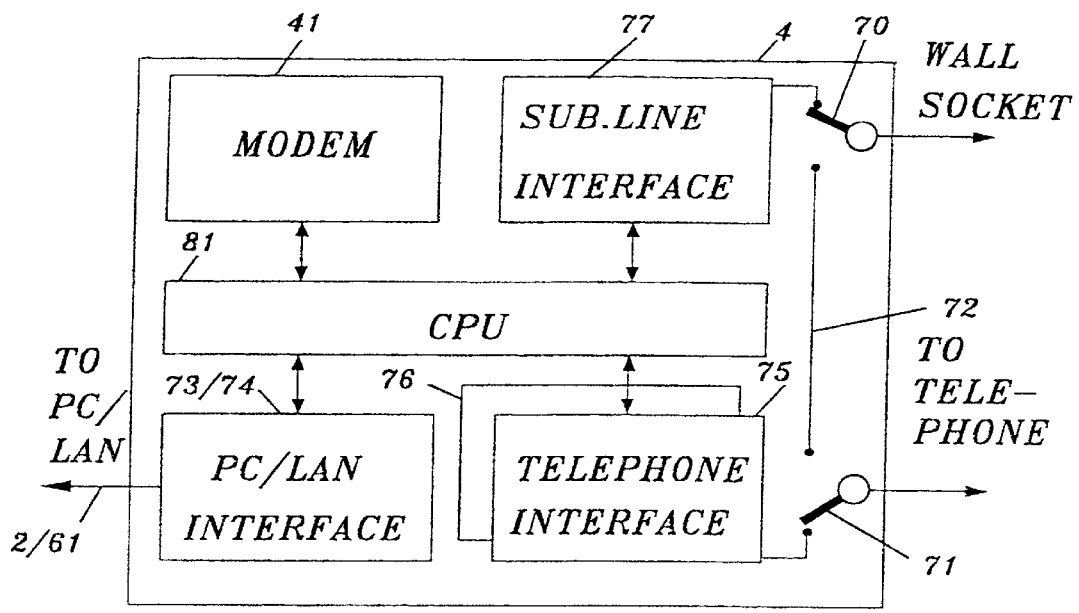
FIG. 8 is a block diagram of the preferred embodiment of an hardware implementation of the modem in accordance with the invention.

In FIG. 8 there is shown a physical implementation of the IP modem 4. The control functionality 81 is implemented by a microprocessor. Hardware and/or software is added for speech encoding, e.g. GSM encoding. Likewise software for driving telephone interface 75 is added to a non shown memory unit that communicates with the CPU. In a preferred embodiment of the invention the standard modem 41 and the coding/decoding provided by the subscriber line interface 77 are implemented using DSP:s (Digital Signal Processors).

The IP MUX/DMUX function 80 is provided by the microprocessor.

Figure 9:
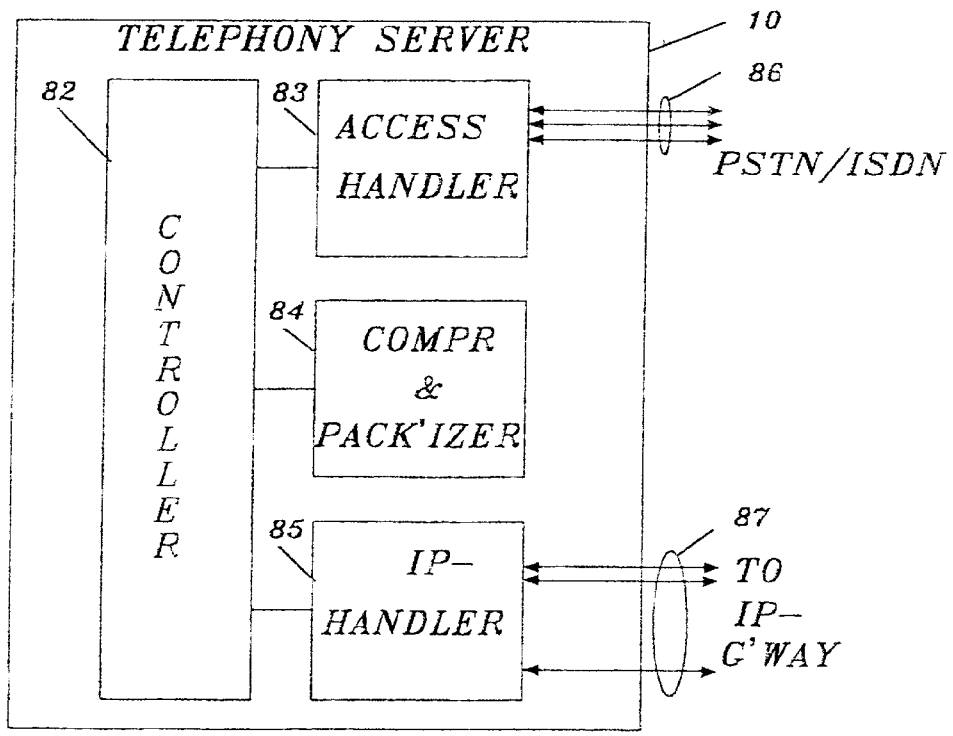
FIG. 9 is a functional block diagram of the telephony in server.

The telephony server 10 shown in FIG. 9 comprises a central controller 82, an access handler 83, a compression and packetizing unit 84, an IP handler 85, PSTN/ISDN lines 86 connected to the PSTN/ISDN network and a number of lines 87 connected to the IP-gateway 8. Under control from the central controller 82 the access handler receives incoming calls, places outgoing calls, handles the telephone numbers of the IP modem, requests the PSTN/ISDN network to activate and deactivate the call forwarding service and provides connections to the IP gateway 8. The compression and packetizing unit converts the speech signals into digital format, and vice versa, so that they can be subjected to digital processing. Digitized speech signals are sampled using conventional sampling technique and are subjected to compression using a conventional speech compression algorithm. Finally the sampled compressed digital signals are organized into packets and sent to the IP handler 85 which provides the packets with addresses and tails so as to form IP packets. The IP handler 85 also controls the flow of IP packets to and from the IP gateway. The IP handler handles the IP layer 53 in FIG. 4.

The lines 86, 87 are preferably digital lines such as ISDN 30B+D (primary rate B) or a digital PABX line (Private Automatic Branch Telephone Exchange). To the telephony server 10 it does not matter whether the telephones 1, 6, 59 are of analogue or digital type because PSTN/ISDN 3 will provide the proper type of signals to the telephones. The telephony server must, however, depacketize the compressed speech and decompress it before it is sent as normal speech information to the PSTN or the ISDN network.

What is claimed is:

1. A modem with IP support for providing simultaneous access to the services of a public telephone network and a public data network over a single telephony subscriber line, said modem with IP support comprising:

dial-up means for autonomous establishment of a dial-up session to an Internet gateway, IP communication means for using IP communications services offered by the Internet gateway to provide the simultaneous access to the services of the public telephone network and the public data network via an IP protocol, telephony application means for autonomous establishment of a connection to a telephony server via said IP communication means via the IP protocol, thereby providing the access to the services of the public telephone network, telephony interface means for interfacing to a standard telephone and, via said telephony application means, supporting the telephony services from the standard telephone, and device interface means for interfacing to devices which use said IP communications means.

2. The modem with IP support according to claim 1, wherein the IP communication means supports one or more applications that communicate via the IP protocol.

3. The modem with IP support according to claim 2, wherein the applications include first applications for communication with external applications residing in hosts connected to the Internet.

4. The modem with IP support according to claim 3, wherein said first applications further communicate with devices connected to the modem with IP support and the external applications.

5. The modem with IP support according to claim 4, wherein one of the first applications is an e-mail poller.

6. The modem with IP support according to claim 3, wherein said first applications include applications for remote control of appliances.

7. The modem with IP support according to claim 1, further comprising LAN interface means for direct connection to an on-premise LAN, thereby providing communication with devices associated with the LAN using the IP protocol in addition to providing access to the services of the public telephone network and the Internet via the IP communication means.

8. The modem with IP support according to claim 7, further comprising router means for selectively routing IP packets received via the telephone interface means and LAN interface means to the dial-up means and for selectively delivering IP packets received via the dial-up means to respective ones of the telephone and LAN interface means.

9. The modem with IP support according to claim 7, further comprising PC interface means for connection to a PC, wherein a telephony application in the PC allows for IP telephony via the subscriber line interface means.

10. The modem with IP support according to claim 9, wherein internal communication, using the IP protocol, is supported between said telephony application in a PC connected to the PC interface means and any of said telephony interfaces via the telephony application in the PC.

11. The modem with IP support according to claim 7, wherein internal communication is supported between the LAN interface means and any of said telephone interface means via said telephony application.

12. The modem with IP support according to claim 1, further comprising at least two telephone interface means, each one connected to a respective telephone loop so as to allow for several independent and simultaneous telephone calls using the IP protocol.

13. The modem with IP support according to claim 12, wherein intercommunication is provided between telephones connected to different telephone interfaces.

14. A system comprising a modem with IP support that, via a dial-up connection in the public telephone network to an internet gateway, accesses the services of an IP network and that comprises applications which, using the IP protocol, accesses services via the IP network, wherein said applications comprise a telephony application that, using the IP protocol, connects the modem with IP support to a telephony server that provides connections in the public telephone network, said modem with IP support thereby providing the services of the public telephone network to a user at a telephone connected to the modem with IP support, the modem with IP support thus providing autonomous simultaneous IP based access to the services of the IP network and to those of the public telephone network over a subscriber line to which the modem with IP support is connected.

15. A method of accessing services of an IP based network and services from a public telephony network via a modem with IP support using an IP protocol, said modem having a subscriber telephone number associated with it, said method comprising the steps of:

establishing a dial-up connection in the public telephony network from the modem with IP support to an IP gateway, setting up an IP link by the IP gateway to the modem with IP support, accessing the services of the IP based network via the IP gateway by the modem with IP support therewith, connecting to a telephony server that provides connections in the public telephone network, and registering the modem with IP support at said telephony server using the IP protocol, therewith accessing the services of the public telephone network via said telephony server, and initiating, by the modem with IP support, and activating, by the telephony server, a call diversion service in the public telephone network so that calls that are directed to the subscriber's telephone number, are directed to the telephony server where they are transferred to the modem with IP support using the IP protocol, wherein said services of the IP based network and those of the public telephone network are autonomously and simultaneously accessible to the modem with IP support, using the IP protocol, over a subscriber line to which the modem with IP support is connected.

* * * * *